United States Patent [19]

Haerr et al.

[11] Patent Number: 5,234,263

[45] Date of Patent: Aug. 10, 1993

[54] ELECTRIC MASTER CYLINDER TRACTION CONTROL

[75] Inventors: Timothy A. Haerr, Enon; Donald L. Parker, Middletown, both of Ohio

[73] Assignee: General Motors Corporation, Detroit, Mich.

[21] Appl. No.: 848,440

[22] Filed: Mar. 9, 1992

[51] Int. Cl.$^5$ .............................. B60T 8/58; B60T 8/34
[52] U.S. Cl. ................................ 303/113.2; 303/115.2
[58] Field of Search .................. 303/116.2, 116.1, 0.3, 303/0.4, 110, 113.2, 115.2

[56] References Cited

U.S. PATENT DOCUMENTS

| | | | |
|---|---|---|---|
| 4,812,723 | 3/1989 | Shimizu | 318/488 |
| 4,957,331 | 2/1990 | Burton et al. | 303/115.2 |
| 5,085,490 | 2/1992 | Steinhauser et al. | 303/115.2 |
| 5,161,865 | 11/1992 | Higashimata et al. | 303/115.2 |

Primary Examiner—Matthew C. Graham
Attorney, Agent, or Firm—Ernest E. Helms

[57] ABSTRACT

Anti-lock/traction control braking system for a vehicle is provided which in a preferred embodiment includes a master cylinder, a brake, a controller providing a signal when a wheel condition is within preset parameters, an isolating value to separate the brake from the master cylinder means when the braking system goes into an anti-lock braking or traction control mode of operation, an anti-lock braking actuator including a bore fluidly connecting with the brake and having a piston reciprocally mounted within and a first motor responsive to a signal given by the controller for powering the anti-lock braking piston. A traction control actuator is also provided having fluid connections with the master cylinder and the anti-lock braking actuator. The traction control actuator has at least one piston reciprocally mounted within a bore. Upon actuation of the traction control the wheel brake is pressurized by the traction control actuator and thereafter traction control modulation of the wheel brake is accomplished by reciprocal movement of the ABS piston within the ABS actuator.

9 Claims, 3 Drawing Sheets

ELECTRIC MASTER CYLINDER TRACTION CONTROL

FIELD OF THE PRESENT INVENTION

The field of the present invention is a vehicle braking system which has anti-lock braking system capabilities as well as traction control braking capabilities. More particularly, the present invention provides a braking system having the above noted capabilities where the traction control capability is an add-on option to the vehicle having an ABS system as described in commonly assigned U.S. Pat. Nos. 5,000,523 and 5,011,237 and U.S. patent application Ser. No. 07/572,307.

DETAILED DESCRIPTION OF THE DRAWINGS

Figure 1:
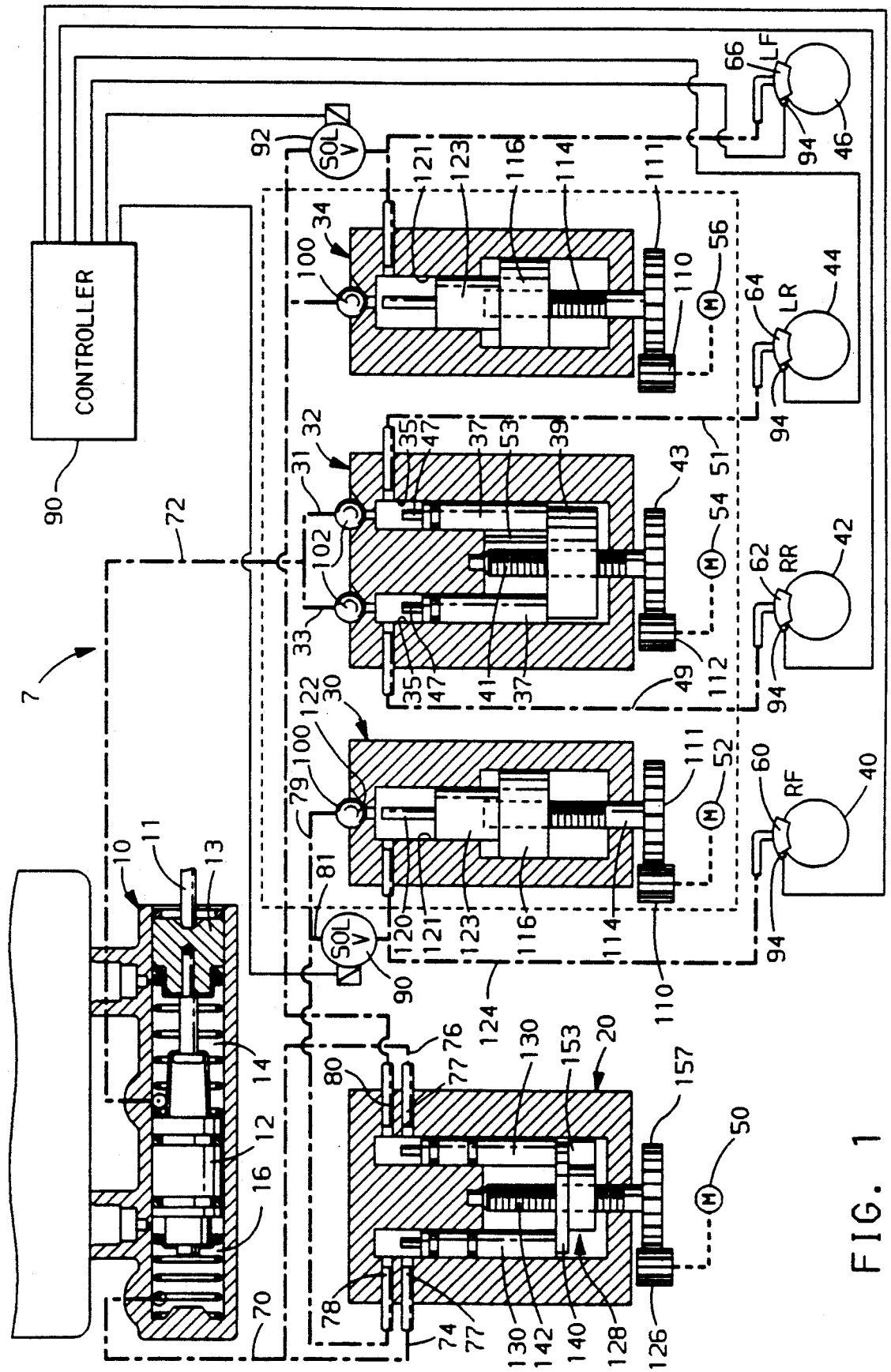
FIG. 1 is a front elevational view partially shown in schematic of a vehicle braking system according to the present invention.

Referring to FIG. 1, the first preferred embodiment of the present invention braking system 7 has a vehicle operator actuated master cylinder 10 controlled by a pedal (not shown) and associated push rod 11. The master cylinder 10 provides pressurized fluid to the wheel cylinders 60, 62, 64 and 66 (hereinafter referred to as wheel brakes) 60, 62, 64 and 66. The wheel brakes 60, 62, 64 and 66 are provided to restrain rotation of the right front wheel 40, right rear wheel 42, left rear wheel 44 and left rear wheel 46, respectively. The master cylinder 10 as shown is of the dual circuit type having a primary circuit 14 (bordered by a primary piston 13 and a secondary piston 12) providing pressurized fluid for the rear wheel brakes 62 and 64 and a secondary circuit 16 separated from the primary circuit 14 by the secondary piston 12) providing pressurized fluid for the front wheel brakes 60 and 66.

Each of the vehicle wheels 40, 42, 44 and 46 has a sensor 94 which provides a controller 90 with information regarding the rotational condition of each vehicle wheel. The controller (90) (which may be separate or part of the vehicle onboard computer) cognizant of the rotational condition of the vehicle wheels, will signal the braking system 7 to an anti-lock (ABS) or traction control (TC) mode of operation dependent upon the rotational condition of the vehicle wheels.

In most vehicles, traction control will only be on one axle unless it is a four-wheel-drive type vehicle. In the example given, the braking system 7 is for a front-wheel-drive type vehicle. The vehicle braking system 7 has an individual ABS actuator 30, 34 for each respective front wheel brakes 60, 66 and a TC actuator 20. For the rear wheel brakes 62 and 64 there is an ABS actuator 32.

The master cylinder 10, as mentioned previously, is a dual-circuit type. In a manner which is well known in the art, actuation of the master cylinder 10 causes pressurization of both the primary and secondary chambers 14, 16. The secondary chamber 14 is connected via a fluid line 72 with the ABS actuator 32 via branch lines 31 and 33. Lines 31 and 33 are connected with corresponding bores 35 for the rear wheel brakes 62, 64 of the vehicle.

Each bore 35 has a corresponding piston 37 which is reciprocally mounted therein and is operatively associated with a non-rotative nut 39 angularly restrained by alignment of a key (not shown) within a slot 53. The nut 39 threadably encircles a drive (or ball) screw 41, which is torsionally associated with a rotary electric motor 54 by a gear train 43.

In the normal mode of braking operation, the pistons 37 will be located upward in an extended position holding their associated spring biased check valves 102 in the open position (by virtue of pins 47) allowing free fluid flow from the master cylinder 10, via line 72, into the bores 35 and out through lines 49 and 51 to their associated wheel brakes 62 and 64. If an ABS mode of operation is signaled, the drive screw 41 will be rotated to retract the nut 39 and pistons 37 causing the check valves 102 to close for isolation of the master cylinder 10 from the wheel brakes 62 and 64. Thereafter, ABS modulation of wheel brake 62 and 64 will take place in unison by selective angular rotation of the drive screw 41.

Although the conditions of either rear wheel 42 or 44 can generate an ABS-type mode of operation, for rear wheel of a vehicle, it has been found to be preferable that both rear wheels go into an ABS mode of operation whenever an ABS condition is sensed for of the rear wheels 42, 44. Traction control is not provided for the rear wheels 42, 44 since they are not the driving wheels of the vehicle in the present example.

Figure 2:
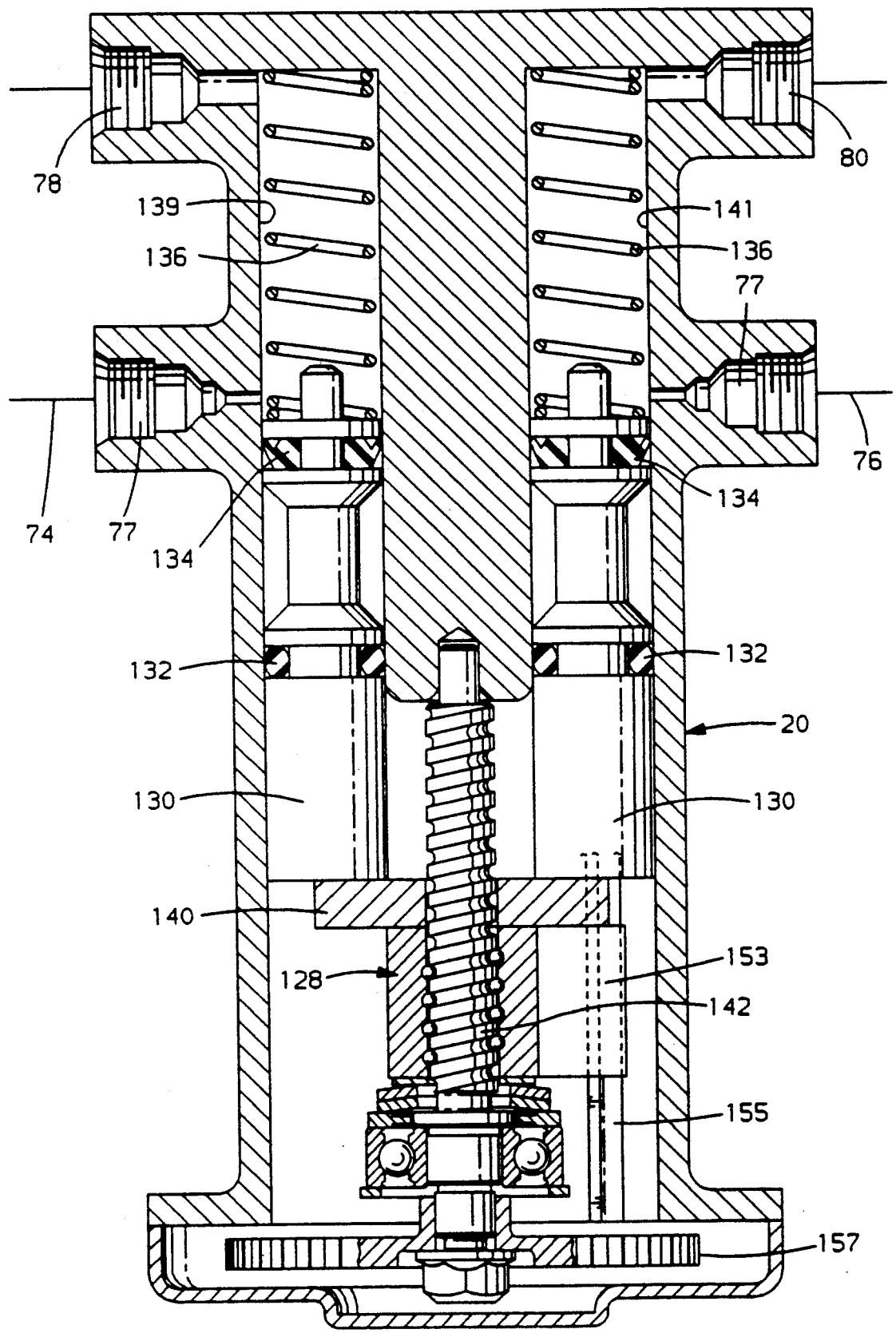
FIGS. 2 and 3 are front elevational views shown partially in section of traction control actuators utilized in the braking systems shown in FIG. 1.

The two front wheel brakes 60 and 66 are connected with the master cylinder secondary chamber via a fluid line 70. The fluid line 70 breaks off into a branch 74 and 76. Referring additionally to FIG. 2, branches 74 and 76 connect with the traction control actuator 20 via alpha inlet connections 77. The traction control actuator 20 as shown has two bores in parallel with one another, bore 139 for the wheel brake 60 and bore 141 for wheel brake 66. The alpha inlets 77 intersect their respective bores 139, 141 almost at their midpoints.

Each piston 130 has a lower seal 132 and an upper V-block seal 134 which only seals with its respective bore when the pressure above the seal 134 exceeds the pressure below the seal 134. The pistons 130 are loaded downward by a spring 136 and are associated with a washer or yoke 140. The yoke 140 is held in position by a ball nut 128 which is non-rotatively mounted within the actuator 20 by virtue of a boss section 153 of the nut being engaged with a ridge 155 of the actuator. Threadably engaged with the nut 128 is a ball or drive screw 142. The drive screw 142 is connected with a gear 157 which is torsionally associated with a traction control reversible rotary electric motor via a gear 126 (FIG. 1). The nut 128, drive screw 142, and gear train 157, 126 provide the means of transmission to convert the rotary action of the electric motor 50 into linear action of the pistons 130. Movement of the pistons pass the alpha inlets 77 causes the pressurization of the chamber above the pistons to cause the V-block seals 134 to seal with their bores 139, 141 therefore pressurizing the wheel brakes 60, 66 while at the same time isolating the wheel brakes 60, 66 from the master cylinder 10.

In the normal mode of operation, actuation of the master cylinder 10 causes fluid flow through the line to the separate branches lines 74 and 76 into the respective bores 139 and 141 and then out through beta outlets 78, 80 to the respective ABS actuators 30, 34. Each ABS actuator 30, 34 has a bore 121 in with a sealed reciprocally mounted piston 123. The ABS actuators 30, 34 are similar to those described in commonly assigned U.S. Pat. Nos. 5,000,523, 5,011,237 and U.S. Ser. No. 07/736,302 and typically will have some type of rotational brake to prevent backdriving of the nut 116 downward by the pressure within the bore 121.

The fluid line between the traction control actuator 20 and the ABS actuator 30 branches off into lines 79, 81. Line 79 connects with an associated spring-loaded check valve 100 which is held open by a pin 120 of the piston 123. The line 81 has fluid connection with the bore 121 and the wheel brake 60 via a solenoid valve 90. The solenoid valve 90 is normally open and during normal actuation of the master cylinder 10, fluid is allowed to flow through the lines 79 and 81 passed the solenoid valve 90 and the check valve 100 out through the outlet to the wheel brake 60.

Each ABS actuator has an associated non-rotative nut 116, drive screw 114 and gear train 110, 111 with an associated individual motor 52, 56 allowing the front wheels to have individual ABS capabilities. As mentioned previously, during normal actuation, the pistons 123 will be in the upward position and fluid can freely flow from the master cylinder 10 via the traction control actuator 20 through the ABS actuators 30, 34 to the respective wheel brakes 60, 66 and backwards as desired. In an ABS situation, the solenoid valves 90, 92 will be signaled to a closed position. The pistons 123 will be retracted, thereby closing their respective check valve 100 and ABS modulation will occur by movement of the piston 123. If only wheel 40 is in an ABS mode, then solenoid 92 will remain open, piston 123 in the ABS actuator 34 will remain extended and normal brake operation for wheel brake 66 will be maintained.

Should a traction control mode of operation be signaled (either wheel 40 or 46), the traction control actuator 20 will be energized to extend the pistons 130 and thereafter modulation will occur by the respective ABS modulator—independently for either wheel. Should traction control need not occur in one of the wheel brakes 60, 66, that wheel brake's ABS modulator piston will be retracted to keep the influx of brake fluid from the actuator 20 from pressurizing that respective wheel brake. If the vehicle operator should actuate the brakes while in traction control fluid in from the alpha connector 77 will flow past the seal 134 and then proceed past the respective solenoid valves 90, 92 to the wheel brakes 60 and 66.

If it is desirable to provide a vehicle without traction control capabilities, the traction control modulator 20 can simply be deleted leaving in the ABS system.

Figure 3:
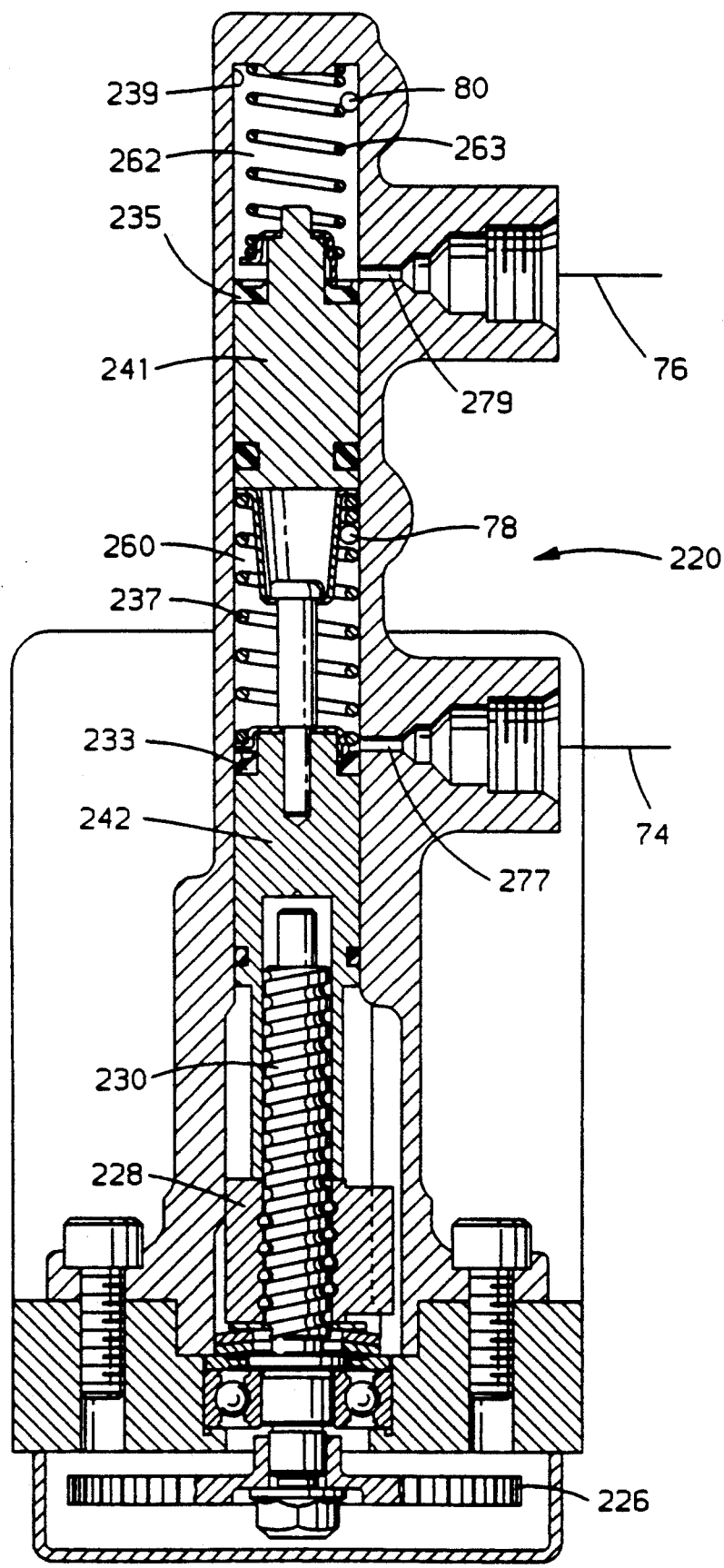

Referring to FIG. 3, an alternative traction control actuator 220 is provided. Traction control actuator 220 is similar to a conventional dual circuit master cylinder but is instead powered by an electric motor. The electric motor (FIG. 1) is torsionally associated with drive screw via a gear train 226, 126. The gear train 226, 126 and non-rotative nut 228 and associated drive screw 230 provide the transmission means for converting the rotational energy of the electric motor 50 into translational movement of a primary piston 242.

The primary piston has biased therefrom a secondary piston 241 by a spring 237 which divides a bore 239 into first 260 and secondary 262 fluid chambers for front wheel brakes. The secondary piston is also biased away from the end wall of the bore 239 by a spring 263 which is less stiff than the spring 237. Primary piston 242 has a V-block seal 233 adjacent the alpha inlet 277. The secondary piston 241 has a V-block seal 235 adjacent alpha inlet 279. The first and second chambers 260, 262 also have beta outlets 78 and 80, respectively.

The advantage of the traction control actuator 220 shown in FIG. 3 is that when only one of the wheel brakes 60, 66 is signaled to a traction control mode, the respective ABS actuator of the other wheel can be signaled so that its associated ABS modulator piston 123 retracts to a position wherein the pin 120 is removed from the check valve 100. The wheel brake that is not in a TC mode will also close its associated solenoid valve, thereby causing a hydraulic lock and the initial pressurization of the wheel brake signaled to a TC mode will occur more rapidly. For instance, a hydraulic lock of the secondary chamber 262 will cause the secondary piston 241 to remain stationary and the primary piston 242 will therefore take less time to fully pressurize the first pressure chamber 260 since the primary piston 242 will now have more rapid relative displacement with respect to the secondary piston 241. The modulation of the traction control mode by the ABS actuators and the ABS actuation will be essentially the same as previously described for the other TC actuator 20.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An anti-lock/traction control braking system for a vehicle wheel comprising:
   master cylinder means for supplying pressurized fluid;
   a wheel brake receiving pressurized fluid from the master cylinder means and for restraining rotational movement of the wheel;
   an anti-lock braking/traction control controller means cognizant of the rotational condition of the wheel and providing a signal when the wheel condition is within preset parameters;
   means for isolating the wheel brake from the master cylinder means when the braking system goes into an anti-lock braking or traction control mode of operation;
   an anti-lock braking actuator including a frame with an anti-lock braking bore fluidly connecting with the wheel brake, and the anti-lock braking actuator having an anti-lock braking actuator piston reciprocally mounted within the anti-lock braking actuator bore;
   a first rotary electric motor responsive to a signal given by the controller means for powering the anti-lock braking actuator piston within the anti-lock braking actuator bore;
   power transmission means for converting rotational movement of the motor to linear movement of the anti-lock braking actuator piston;
   a traction control actuator having a bore with fluid connections with the master cylinder means and the anti-lock braking actuator, the traction control actuator having at least one traction control piston reciprocally mounted within the traction control actuator bore;

a second rotary electric motor responsive to the controller means for powering the traction control actuator piston within the traction control actuator bore;

second transmission means for converting rotational power of the second motor to translational movement of the traction control actuator piston, wherein upon actuation of the traction control actuator piston the wheel brake is pressurized and thereafter traction control modulation of the wheel brake is accomplished by reciprocal movement of the anti-lock braking actuator piston.

2. A braking system as described in claim 1 wherein the anti-lock braking actuator bore is fluidly connected with the traction control actuator via a first line which has inserted therein a normally open solenoid valve responsive to a signal given by the controller means and via a second fluid line having inserted therein a check valve which is open by the anti-lock braking actuator piston when the anti-lock braking actuator piston is in an upright position.

3. A braking system as described in claim 1 wherein movement of the traction control actuator piston in the extending position to cause pressurization of the wheel brake causes the traction control actuator piston to isolate the wheel brake from the master cylinder means.

4. A braking system as described in claim 1 having anti-lock braking and traction control capabilities for at least two separate wheel brakes wherein the traction control actuator has a single traction control actuator bore with pressure chambers in tandem with one another for the separate wheel brakes with a secondary traction control actuator piston separating the pressurization chambers, the secondary traction control actuator piston being spring-biases to an intermediate position away from the other traction control actuator piston.

5. A braking system as described in claim 1 wherein the traction control actuator includes a non-rotative nut slidably mounted within the traction control actuator bore and is operatively associated with the traction control actuator piston, and the nut is threadably inserted by a drive screw which is torsionally associated with the second electric motor.

6. A method of providing an anti-lock braking mode and a traction control mode to a vehicle wheel brake comprising:

supplying pressurized fluid from a master cylinder means;

receiving pressurized fluid from the master cylinder means with a wheel brake to restrain rotational movement of the vehicle wheel;

sensing the rotational condition of the wheel and providing a signal in response thereto when the rotational condition is within preset parameters with an anti-lock braking and traction control controller means;

isolating the wheel brake from the master cylinder when the braking system goes into an anti-lock braking or traction control mode;

fluidly connecting with the wheel brake an anti-lock braking actuator bore of an anti-lock braking actuator which includes an anti-lock braking actuator piston reciprocally mounted within the anti-lock braking actuator bore;

powering the anti-lock braking actuator piston to modulate the pressure within the wheel brake by reciprocally moving the anti-lock braking actuator piston with a first rotary electric motor via a first transmission means which converts the rotary motion of the first rotary electric motor into reciprocal linear motion of the anti-lock braking actuator piston;

fluidly connecting intermediate the master cylinder means and the anti-lock braking actuator a traction control actuator bore of a traction control actuator having at least one traction control actuator piston reciprocally mounted therein; and powering the traction control actuator piston by a second rotary electric motor via a second transmission means for converting the rotary motion of the second rotary electric motor into linear motion of the traction control actuator piston to pressurize the wheel brake when the braking system goes into a traction control mode and thereafter modulating the pressure within the wheel brake while the system is in a traction control mode by reciprocally moving the anti-lock braking actuator piston of the anti-lock braking actuator.

7. A method as previously described in claim 6 further comprising providing traction control for at least two wheel brakes independently with a common traction control actuator having pressurization chambers in tandem with one another and with a secondary piston spring-biased from the traction control actuator piston and further inserting a solenoid valve responsive to the signal given by the controller means between separate lines to independent anti-lock braking actuators wherein the response time for traction control mode to a single wheel brake is amplified by closing the solenoid valve to the anti-lock braking actuator of the wheel brake not currently involved in a traction control mode, thereby increasing the pressurization rate to the other wheel brake.

8. A vehicle wheel anti-lock/traction control braking system for a vehicle having at least two powered wheels on a common axle, the system providing independent traction control mode for at least first and second powdered wheels, the braking system comprising:

a master cylinder for supplying pressurized fluid;

first and second wheel brakes receiving pressurized fluid from the master cylinder for restraining rotational movement of the first and second powered wheels;

an anti-lock braking/traction control controller cognizant of the rotational condition of the wheels and providing a signal when the conditions of the wheels are within preset parameters;

first and second solenoid valves for isolating the first and second wheel brakes, respectively, from the master cylinder when the braking system goes into an anti-lock braking control mode of operation;

first and second anti-lock braking actuators, each including a frame with an anti-lock braking actuator bore fluidly connecting with the respective wheel brake, and an anti-lock braking actuator piston reciprocally mounted within the anti-lock braking actuator bore, the bore of the anti-lock braking actuators being fluidly supplied with pressurized fluid via a check valve opened by the anti-lock actuator piston, when the anti-lock actuator piston is in an extended position, to allow fluid communication with the respective wheel brake independent of the condition of the respective solenoid valve;

first and second first anti-lock rotary electric motors responsive to a signal given by the controller for powering the respective anti-lock braking actuator pistons within the bore;

first and second non-rotative nuts threaded by drive screws torsionally associated with the respective first anti-lock rotary electric motors for converting rotational movement of the first rotary electric motors to linear movement of the anti-lock braking actuator pistons;

a traction control actuator having generally parallel first and second traction control actuator bores having a respective alpha fluid connection with the master cylinder and a respective beta fluid connection with the first and second anti-lock braking actuator via the solenoid valve and check valve, the alpha and beta connections being axially spaced from one another and each traction control actuator bore having a traction control actuator piston having a unidirection type seal allowing flow from the alpha connection to the beta connection but preventing flow in reserve;

the traction control actuator pistons being operatively associated with a common nonrotative nut threadably engaged with a drive screw torsionally associated with a traction control electric motor responsive to a signal given by the controller to pressurize the wheel brakes when the braking system is signaled to a traction control mode and also by movement of the traction control actuator pistons isolate the respective wheel brakes from the master cylinder and wherein modulation of the wheel brakes is accomplished by movement of the anti-lock actuator pistons and wherein pressurization of a wheel brake can be avoided when the other wheel brake is signaled to the traction control mode by isolating the wheel brake which is not in the traction control mode by moving that wheel brake's anti-lock braking actuator piston to a retracted position to close off the check valve.

9. A vehicle wheel anti-lock/traction control braking system for a vehicle having at least two powered wheels on a common axle, the system providing independent traction control mode for at least first and second powered wheels, the braking system comprising:

a master cylinder for supplying pressurized fluid;

first and second wheel brakes receiving pressurized fluid from the master cylinder for restraining rotational movement of the first and second powered wheels;

an anti-lock braking/traction control controller cognizant of the rotational condition of the wheels and providing a signal when the conditions of the wheels are within preset parameters;

first and second solenoid valves for isolating the first and second wheel brakes from the master cylinder when the braking system goes into an anti-lock braking mode of operation;

first and second anti-lock braking actuators, each anti-lock braking actuator including a frame with an anti-lock braking actuator bore fluidly connecting with one of the wheel brakes, and an anti-lock braking actuator piston reciprocally mounted within the anti-lock braking actuator bore, the bore of the anti-lock braking actuators being fluidly supplied with pressurized fluid via a check valve opened by the anti-lock braking actuator piston, when the anti-lock braking actuator piston is in an extended position, to allow fluid communication with the wheel brake independent of the condition of the solenoid valve;

first and second first anti-lock rotary electric motors responsive to a signal given by the controller for powering the anti-lock braking actuator pistons within the bore;

first and second nonrotative nuts threaded by drive screws torsionally associated with the first anti-lock rotary electric motors for converting rotational movement of the respective motors to linear movement of the anti-lock actuator pistons;

a traction control actuator having a bore divided into respective tandem first and second pressure chambers by a secondary piston spring biased away from a primary piston, the first and second pressure chambers having an alpha fluid connection with the master cylinder and a beta fluid connection with one of the first and second anti-lock braking actuators via one of the solenoid valves and check valves, the alpha and beta connections being axially spaced from one another and each traction control actuator piston having a unidirection type seal allowing flow from the alpha connection to the beta connection but preventing flow in reserve;

the primary traction control actuator piston being operatively associated with a nonrotative nut threadedly engaged with a drive screw torsionally associated with an electric motor responsive to a signal given by the controller to pressurize the wheel brakes when the braking system is signaled to a traction control mode, and movement of one of the traction control pistons isolates one of the wheel brakes from the master cylinder and wherein modulation of one of the wheel brakes is accomplished by movement of one of the anti-lock actuator pistons and wherein the rate pressurization of a wheel brake signaled to a traction control mode when the other wheel brake is not in a traction control mode is increased by isolating the wheel brake which is not in the traction control mode by moving that wheel brake's anti-lock braking actuator piston to a retracted position to close off the check valve and by closing the solenoid valve of the wheel brake which is not in the traction control mode.

* * * * *